US009166801B2

(12) United States Patent
Hermann et al.

(10) Patent No.: US 9,166,801 B2
(45) Date of Patent: Oct. 20, 2015

(54) INTRINSICALLY SAFE CONNECTION UNIT WITH A NETWORK INTERFACE, INTRINSICALLY SAFE APPLIANCE AND NETWORK INTERFACE FOR IT

(75) Inventors: Helmut Hermann, Bochum (DE); Markus Lenzing, Ludinghausen (DE); Karsten Schwinne, Hamm (DE); Johannes Wesselmann, Dortmund (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 526 days.

(21) Appl. No.: 13/575,910

(22) PCT Filed: Jan. 28, 2011

(86) PCT No.: PCT/IB2011/050376
§ 371 (c)(1),
(2), (4) Date: Aug. 21, 2012

(87) PCT Pub. No.: WO2011/092651
PCT Pub. Date: Aug. 4, 2011

(65) Prior Publication Data
US 2012/0315793 A1    Dec. 13, 2012

(30) Foreign Application Priority Data
Feb. 1, 2010 (DE) .................... 20 2010 000 110 U

(51) Int. Cl.
*H02H 1/04* (2006.01)
*H04L 12/10* (2006.01)
(Continued)

(52) U.S. Cl.
CPC ............ *H04L 12/10* (2013.01); *G05B 19/0425* (2013.01); *G05B 2219/24028* (2013.01); *H02H 3/05* (2013.01)

(58) Field of Classification Search
CPC ................. G05B 19/0425; G05B 2219/24028; H04L 12/10; H04L 12/40032; H02H 3/05; H02H 9/008
USPC ........................................................ 361/119
See application file for complete search history.

(56) References Cited

U.S. PATENT DOCUMENTS 3,614,539 A * 10/1971 Hallenbeck .................... 361/837
3,997,733 A * 12/1976 Sanders ....................... 379/176
(Continued)

FOREIGN PATENT DOCUMENTS

DE    10 2005 042 257 A1    3/2007
DE    10 2005 042 257 B4    3/2007
(Continued)

*Primary Examiner* — Ronald W Leja

(57) ABSTRACT

An intrinsically safe connection unit with a network interface for intrinsically safe appliances in explosion-risk areas, having a housing, a voltage supply connection, plug connection for connecting an intrinsically safe appliance via a transmission cable, and a decoupling circuit. For allowing even a multiplicity of network subscribers to be connected in the explosion-risk area with less wiring complexity, a plurality of plug connections of the same type are provided as network interface, each being preceded by a separate decoupling circuit, and the voltage supply connection builds a central feed connection with separate supply cores for each plug connection each having at least two plug contacts for data communication and at least two plug contacts for supplying power to the connectable appliances via the transmission cable. The invention relates also to a Controller and a network interface for use therewith.

27 Claims, 3 Drawing Sheets

(51) Int. Cl.
*G05B 19/042* (2006.01)
*H02H 3/05* (2006.01)

(56) References Cited

U.S. PATENT DOCUMENTS

| | | | | |
|---|---|---|---|---|
| 5,357,518 | A * | 10/1994 | Peter | 714/4.5 |
| 6,037,857 | A | 3/2000 | Behrens et al. | |
| 7,136,342 | B2 * | 11/2006 | Gushima et al. | 369/59.12 |
| 7,557,548 | B2 * | 7/2009 | Fey | 323/266 |
| 2002/0002426 | A1 * | 1/2002 | Burkhard | 700/286 |
| 2003/0083038 | A1 * | 5/2003 | Poon et al. | 455/344 |
| 2004/0002269 | A1 * | 1/2004 | Jahn | 439/894 |
| 2004/0230401 | A1 * | 11/2004 | Duren et al. | 702/184 |
| 2004/0254651 | A1 * | 12/2004 | Uhlendorf et al. | 700/9 |
| 2005/0024160 | A1 * | 2/2005 | Vazach et al. | 333/81 R |
| 2006/0077612 | A1 * | 4/2006 | Kothari et al. | 361/115 |
| 2006/0100799 | A1 * | 5/2006 | Karam | 702/57 |
| 2008/0180226 | A1 | 7/2008 | Schmidt | |
| 2008/0285186 | A1 * | 11/2008 | Kothari et al. | 361/56 |
| 2010/0283560 | A1 | 11/2010 | Sommer | |
| 2011/0171497 | A1 * | 7/2011 | McGuire | 429/7 |
| 2012/0315793 | A1 * | 12/2012 | Hermann et al. | 439/620.01 |
| 2012/0320997 | A1 * | 12/2012 | Lenzing et al. | 375/257 |
| 2015/0032909 | A1 * | 1/2015 | Remple et al. | 710/14 |

FOREIGN PATENT DOCUMENTS

| | | |
|---|---|---|
| DE | 10 2007 036 964 A1 | 2/2009 |
| EP | 0 666 631 A2 | 8/1995 |
| EP | 1 883 179 A1 | 1/2008 |
| EP | 1883179 A1 * | 1/2008 |
| WO | 2006/041949 A1 | 4/2006 |
| WO | 2007/040539 A1 | 4/2007 |
| WO | 2007/088387 A1 | 8/2007 |

* cited by examiner

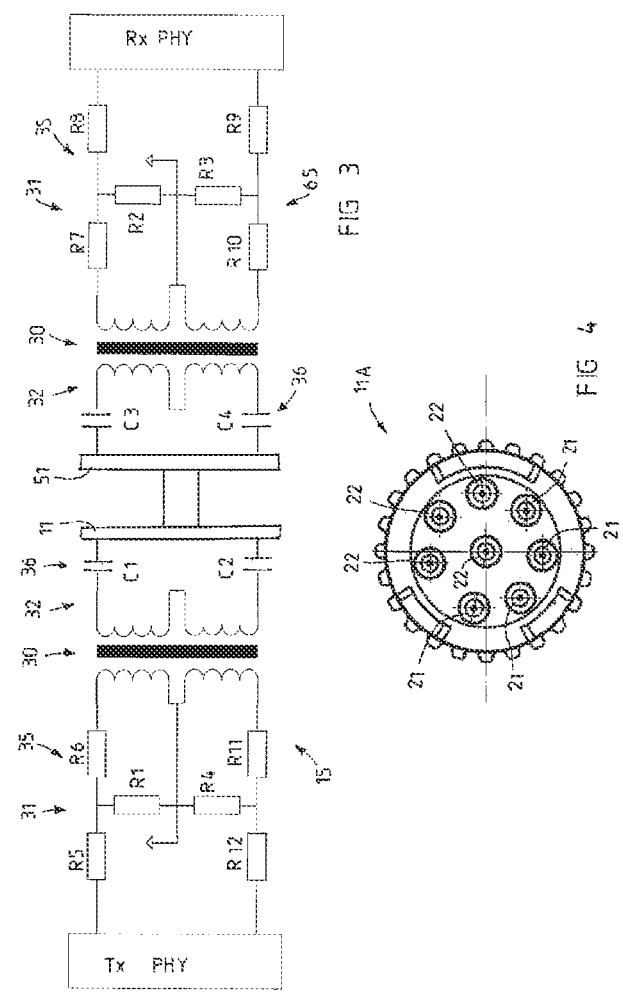

INTRINSICALLY SAFE CONNECTION UNIT WITH A NETWORK INTERFACE, INTRINSICALLY SAFE APPLIANCE AND NETWORK INTERFACE FOR IT

The invention relates to an intrinsically safe connection unit with a network interface for intrinsically safe appliances in explosion-risk areas, in particular for mining, such as coal mining, having a housing, having a voltage supply connection on the housing, having at least one plug connection on the housing for connection of a transmission cable by means of which an intrinsically safe appliance can be connected to the connection unit, and having a decoupling circuit, which is connected upstream of the at least one plug connection and is arranged in the housing. The invention furthermore relates to an intrinsically safe controller for connection to a connection unit with a network interface, wherein the controller is provided with an appliance housing, with a plug connection which is arranged on the appliance housing for a transmission cable, and with a decoupling circuit which is arranged in the appliance housing and is connected downstream from the plug connection. Finally, the invention also relates to a network interface for explosion-risk areas, in particular for mining, having a circuit stage on the electronics side and having a circuit stage on the plug side, which is connected to a plug connection via a decoupling circuit.

BACKGROUND OF THE INVENTION

US 2010/0283560 discloses a device for use in explosion-risk areas, in which two appliances can be connected to one another without any problems via a transmission line, for data interchange purposes, by providing decoupling networks on the input side of the appliances, which are dimensioned and designed such that the energy which can be stored in the decoupling network cannot exceed a predeterminable maximum value. This is intended to effectively prevent the creation of ignition sparks, which could lead to an explosion of a gas mixture in explosion-risk areas, while complying with the respectively applicable explosion protection standards. The network interface is also intended to comply with the Ethernet transmission standard. The transmission element in DE 10 2007 036 964 A1 builds on a standard Ethernet circuit, in which the transmission elements for the decoupling network are formed with capacitors, in order to limit the energy which can be stored in the transmission elements.

DE 10 2005 042 257 B4 discloses data communication being provided in the explosion-risk mining field on the one hand via wireless LAN (WLAN) and on the other hand by commercially available standard components, in which case the electrical Ethernet data communication which is used internally in the appliances is converted via medium converters to optical signals, in order then to use these optical signals in the network infrastructure of the mine. The standard components are encapsulated, potted, in an intrinsically safe form in the central unit, and are accommodated in a housing, which is licensed as being intrinsically safe, and is composed, in particular, of stainless steel.

In the meantime, the demand for automation in explosion-risk areas, for example in coal mining, have become as great as those above ground. In general, centrally arranged control stations are used for machine control and monitoring of mobile machines which are used in hazardous areas, and are positioned in those areas in which there are no problems with explosion protection. In order to allow above-ground control stations, for example, to also control and monitor complex automation processes, a large number of different sensors and actuators, including measurement and diagnosis systems, are required, although these have to be used in the explosion-risk area. Even in explosion-risk areas, there are therefore demands to allow an interface network which has become established in normal areas of application, in particular a network based on the Ethernet protocol, to be used. Ethernet based on the use of glass fibres is nowadays used predominantly in explosion-risk areas. The maintenance and servicing effort is considerably greater here. The glass fibre cable does not offer the capability to provide an electrical supply to the communication subscriber.

SUMMARY OF THE INVENTION

The invention therefore has an object of overcoming this problem and of allowing even a multiplicity of network subscribers to be connected in the explosion-risk area, with less wiring complexity.

In order to achieve this object and others, a connection unit is proposed in which a plurality of electrically conductive plug connections of the same type are provided as network interface connections on the housing, with a separate decoupling circuit being connected upstream of each network interface connection, with the voltage supply connection on the housing preferably being in the form of a central feed connection with separate supply cores for each plug connection, and wherein each plug connection has at least two plug contacts for data communication and at least two plug contacts, which are connected to the associated supply cores, for supplying power to the appliances which can be connected to the connection unit via the transmission cable. An intrinsically safe network switch is also provided with the intrinsically safe connection unit, in which switch each plug connection is used both for data communication and the power supply of the connected appliances, sensors, actuators or the like. Each network subscriber connected to the connection unit can also be operated on the one hand for signalling purposes via an electrically conductive and preferably copper-based network interface and, at the same time, where the network subscriber requires a power supply, the power supply to this network subscriber can also be ensured via the same plug connection. It is self-evident that transmission cables which are suitable for this purpose should then also be used here.

In the connection unit according to the invention, it is preferably possible to connect only one specific appliance to one plug connection, or to use one plug connection as a feed connection for a supply circuit having a plurality of subscribers. When a supply circuit is connected to a plug connection, all the connected appliances can then be supplied with power via the associated supply cores for this plug connection. The integration of signal and voltage supply cores in a single plug connection makes it possible to considerably reduce the wiring required in the explosion-risk area. All the necessary connections for individual network subscribers or appliances can be carried in one transmission cable, if necessary also carried in a protected form in a flexible hydraulic tube, as a transmission cable.

In one preferred refinement, the connection unit on the housing has a total of X plug connections for the combined data and power supply, with the preferably central feed connection having 2*X supply cores and two additional supply cores; the additional supply cores are preferably used for separately supplying power to the decoupling circuits, in particular to electronics which are normally connected upstream of the decoupling circuits. The connection unit preferably has a central feed connection, which has two supply cores for each plug connection. The electronics within the connection unit are galvanically isolated via two additional supply cores from the supply cores for supplying the individual plug connections with power. In the particularly preferred refinement, X=6 plug connections are formed on the housing, as a result of which the feed connection has 14 poles. Seven voltage circuits can then be supplied via this feed connection, with one voltage circuit being provided for supplying power to the electronics in the connection unit.

In order to additionally allow DC-isolated data transmission and/or data transmission for particularly long connecting paths, for example of several kilometers, as well by means of the connection unit. It is also advantageous to provide at least one optical connection, preferably two optical connections, for optical data communication on the housing of the connection unit, in addition to the plug connections. It would optionally also be possible to provide additional plug connections on the housing, without plug contacts for supplying power, and/or additional plug connections with blind contacts, which are not connected to supply cores, in order if required to allow network subscribers to be connected directly to the connection unit, which network subscribers are used for pure diagnosis functions and monitoring functions and do not require a separate power supply.

In order to ensure that the electrical resistance of the supply cores is as low as possible, possibly with a limited cable cross section, it is particularly advantageous for each plug connection to be provided with in each case two plug contacts for each power potential and with four plug contacts for data communication, that is to say with a total of 8 plug contacts. Furthermore, it is preferably to provide that the central feed connection can be connected to a power supply unit via a power supply cable having (2*X+2) cores, in particular a 14-core power supply cable, which power supply unit has X+1 separate power supply in a preferably pressure-resistant housing, with the output side of each power supply being connected to a feed connection of the power supply cable via two supply cores. Each plug connection within the connection unit is also supplied with power from a separate power supply; at the same time, the electronics for the decoupling circuits are also supplied with power by a separate power supply, in which case, in fact, this power supply provides the power supply for the electronics and for all the decoupling circuits.

The above objects are also achieved by an intrinsically safe controller for connection to a corresponding connection unit, wherein the controller is characterized in that the plug connection has at least two, and preferably four, plug contacts for data communication and at least two plug contacts for supplying power via the transmission cable, and wherein the plug contacts for the power supply are connected to electronics, which are arranged in the housing, for the decoupling circuit and/or to the decoupling circuits which are arranged in the appliance. A corresponding controller can also be connected to one of the plug connections on the connection unit, wherein the power supply for the controller is provided via the plug contacts for the power supply to the connection unit, and the associated plug contacts on the plug connection of the controller. According to one advantageous refinement, the controller can be provided with a secondary plug connection, which is designed to be identical to the plug connection and is likewise connected to the electronics in the controller, wherein the plug contacts for the power supply on the secondary plug connection are directly electrically connected to the plug contacts on the plug connection. The power supply to the secondary plug connection is also passed through the appliance. In order to comply with the requirements for intrinsic safety, it is particularly advantageous for the electronics which are connected upstream of the decoupling circuits in the connection unit or the intrinsically safe controller each to have an associated power limiting circuit on the input side, by means of which the current which is supplied to the power supply for the electronics and the decoupling circuits, and the voltage which is applied to the electronics or the decoupling circuits, are limited to a predeterminable input current and a predeterminable input voltage for the electronics. The output current and the output voltage from the power limiting circuit, which at the same time form the input voltage and the input current for the electronics and the decoupling circuits for the network interfaces, are limited by this measure to maximum values at which spark formation or any other state which is a hazard in compliance with explosion protection can definitively and effectively be precluded. By way of example, the power limiting circuit can limit the power to less than 3 watts.

It is advantageous for the connection unit and the intrinsically safe controller to be equipped with network interfaces which comply with the requirements for intrinsic safety and allow licensing for explosion-risk areas. In order to achieve this, it is particularly advantageous for the decoupling circuit to have a circuit stage on the plug connection side and a circuit stage on the electronics side, providing DC voltage decoupling for the circuit stage on the plug connection side, wherein the circuit stage on the electronics side has a resistance network for radio-frequency power limiting and/or the circuit stage on the plug side has a capacitor network for direct-current power decoupling from other plug connections of the same type. In normal circumstances, both a resistance network and a capacitor network are used. A network interface such as this may in particular be in the form of an Ethernet interface for transmission of the Ethernet IP protocol, which has PHY semiconductor components for data communication, in a manner known per se. A capacitor network with capacitors preferably connected in series allows the direct current power in the signal path downstream from PHY components to be limited. With preferably two resistances in each case in each signal path of a resistance network, the power of the radio-frequency circuit, via which in principle communication data can flow at a data rate of 100 Mbit/s, can be limited. These measures allow any desired number of appliances to be connected together by appropriate network interfaces in intrinsically safe networks.

A corresponding network interface with a circuit stage on the electronics side and with a circuit stage on the plug side, in which the circuit stage on the electronics side has a resistance network for radio-frequency power limiting and/or the circuit stage on the plug side has a capacitor network for direct-current power decoupling from other network interfaces is of independent inventive importance. In a network interface such as this, even if it forms a component of a connection unit or of a controller, it is particularly advantageous for each circuit stage on the electronics side to have a transmitter part for bidirectional data communication, preferably with a suitable Tx-PHY semiconductor component, and a receiver part, with a suitable Rx-PHY semiconductor component, wherein a transmission element of the decoupling circuit is connected downstream from a two-pole transmitter output, and a separate transmission element of the decoupling circuit is in each case connected upstream of the two-pole receiver input, and decouples the circuit stage on the plug side from the circuit stage on the electronics side. A capacitor can be connected between the transmission element and the plug contact of data communication on the plug connection for each contact pole of a transmitter output or receiver input in the circuit stage on the plug side, for voltage decoupling, in particular DC voltage decoupling, and/or resistors, as port elements with a 2-port characteristic, can be connected between each contact pole and the associated transmission element for radio-frequency power limiting. Capacitors between the plug contacts on the plug connection and the respective transmission element allow effective direct-current power coupling to be achieved even when appliances which are connected to one another are fed via different power supplies. Possible destruction of the transmission elements by external influences can therefore not occur. An additional resistance network with resistors which are arranged between the transmission element and the PHY semiconductor components at the same time makes it possible to limit the radio-frequency power, with minimal matching losses with respect to the terminating impedances. The combination of the abovementioned features in particular allows licensing for use in explosion-risk areas.

It is particularly advantageous for a capacitor to be connected in the capacitor network between each plug contact for data communication and the circuit stage, in which case the capacitors in the capacitor network should preferably each comprise two series-connecting capacitor elements, for redundancy reasons.

The connection unit, the controller and the network interface are preferably provided with a plug connection which has eight plug contacts, of which two plug contacts are in each case provided for each power potential, and four plug contacts for data communication.

These and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

FIG. 3 shows a detail view of a part of the network interface according to the invention as shown in FIG. 2, for bidirectional data communication; and FIG. 4 shows a plug contact configuration which is preferably used in the connection unit, the controller and/or the network interface.

DETAILED DESCRIPTION OF EMBODIMENTS

Figure 1:
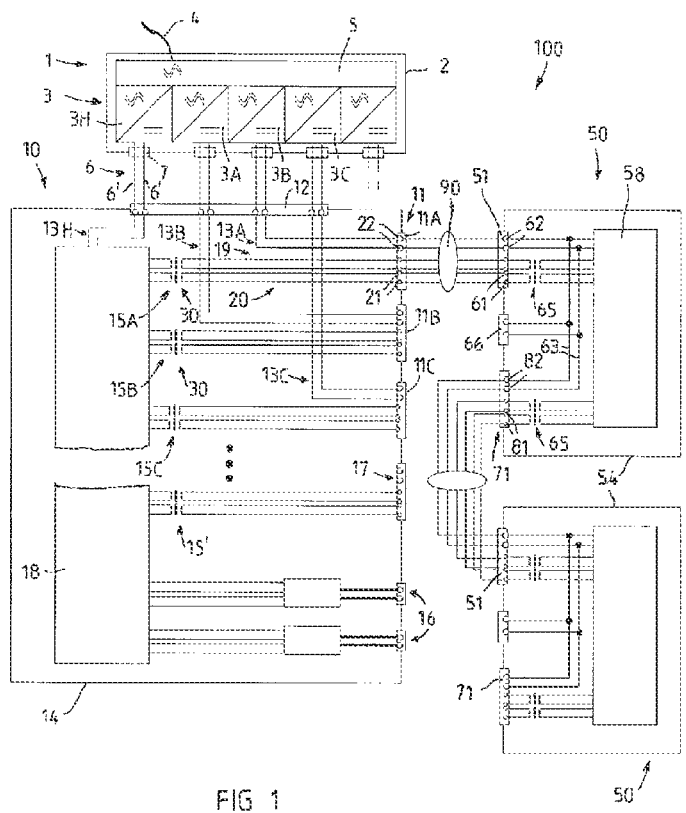
FIG. 1 uses a schematic circuit diagram to illustrate a connection unit having a plurality of plug connections, which each comprise network interfaces, a power supply unit with a plurality of power supplies for supplying voltage to the connection unit, as well as a subscriber circuit which is connected to the connection unit and has two intrinsically safe controllers.

Referring now to the drawings wherein the showings are for the purpose of illustrating preferred and alternative embodiments of the invention only and not for the purpose of limiting same, FIG. 1 uses a schematically simplified sketch to illustrate the basic configuration of a network infrastructure for a network 100 for explosion-risk areas using an intrinsically safe connection unit 10 according to the invention, as well as in this case two intrinsically safe controllers 50 according to the invention, which in FIG. 1 are connected together to form a subscriber chain on the network 100. Power is supplied both to the connection unit 10 and to the intrinsically safe controllers 50 via a power supply unit 1 which preferably has a pressure-resistant, encapsulated housing 2, in which a plurality of separate power supplies 3A, 3B, 3C, which are annotated in their totality with the reference symbol 3, are arranged. The number of power supplies 3 in the power supply unit depends on the number of plug connections 11, network interfaces 15 and voltage circuits which can be connected to the connection unit 10. In the illustrated exemplary embodiment in FIG. 1, only three of the preferably six plug connections 11 which are provided are illustrated, with these plug connections being annotated with the reference symbols 11A, 11B, 11C in FIG. 1. In one preferred refinement, a power supply unit 1 is used which has a total of seven separate power supplies 3, wherein each of these power supplies 3H, 3A, 3B, 3C is supplied with power by means of a central power line 4, which is connected to an alternating-current input side 5 of the power supply unit 1. Each intrinsically safe power supply 3A, 3B etc. converts the power supplied to it to a DC voltage and a direct current, for which reasons a DC voltage supply for the individual assemblies in the connection unit 10 can in each case be provided via the cores 6' on the secondary side of the power supply unit 1. As is still to be explained, the downstream controllers 50 are also supplied with power via the power supplies 3 in the power supply unit 1. The individual cores 6' of the power supply cable 6, that is to say fourteen cores 6' when there are seven power supplies, are preferably arranged within a single supply cable in order on the one hand with the housing 2 of the power supply unit 1 can be provided with a preferably central voltage supply output 7 for the power supply cable 6, and on the other hand in order that a central feed connection 12 can be provided on the connection unit 10. Each feed pole which is connected to one of the cores 6' is in turn connected at the feed connection 12 via a separate pair of supply cores 13A, 13B, 13C to an associated plug connection 11A, 11B, 11C.

The connection unit 10 has a housing 14 which is preferably composed of metal and is closed, forming a seal, by a metal cover which is covered by means of a seal. Within the housing 14, a network interface 15, which is annotated with the reference symbol 15 overall, is provided at least for each of the plug connections 11A, 11B, 11C, with the network interface associated with the individual plug connections 11A, 11B, 11C in FIG. 1 being annotated correspondingly with the reference symbols 15A, 15B, 15C. In addition to the preferably six plug connections 11, which are each connected via separate supply cores 13A, 13B, 13C to the central feed connection 12, the connection unit 10 also has two optical connections 16, as well as a blind plug connection 17 here as well, which, although it has a network interface 15', is not, however, connected to one of the power supplies 3 in the power supply unit 1. Such blind plug connections 17 could also be omitted and in this case are intended only to indicate that additional components can be integrated in a connection unit 10.

In the illustrated exemplary embodiment, electronics 18 are connected upstream of all of the network interfaces 15 in which case these electronics 18, which are connected upstream of the network interfaces 15A, 15B, 15C, 15', are supplied, possibly together with further circuit elements accommodated on printed circuit boards and the like in the connection unit 10, via the separate supply cores 13H with the power from the first power supply 3H from the power supply unit 1. The individual network interfaces 15 are also supplied with power via a separate power supply 3H and in each case independently of that power supply 3A, 3B, 3C via which power is supplied to the downstream controllers 50 on the same plug connection 11A, 11B. In addition to a power supply, each of the plug connections 11 also allows data communication via the associated network interface 15. Power is supplied for the entire data communication process within the network 100, and in particular within the connection unit 10, separately from the power supply for the individual controllers and subscriber circuits. As can also be seen from the illustration of the connection unit 10 in FIG. 1, each network interface 15, which preferably allows data communication based on the Ethernet IP protocol, in each case has two signal paths 19 for data communication in one direction, and two separate signal paths 20 for data communication in the other direction. Each plug connection 11, as well as the blind plug connection 17, therefore in the illustrated exemplary embodiment has four plug contacts 21, which are illustrated by means of the relatively small circles, for data communication. In addition to the plug contacts 21 for data communication, there are at least two plug contacts 22, which are indicated by means of the large circles, on each plug connection 11, in order to allow the associated supply cores 13B, 13C and the power supplied via them to be tapped off at the respective plug connection 11A, 11B. In order to minimize the electrical resistance of the supply cores with limited cable cross sections, it is particularly advantageous for each of the two plug contacts 22 for the power supply to be duplicated, such that there are a total of eight plug contacts 21, 22 on each plug connection 11A, 11B, for example for a plug connection 11A as illustrated in FIG. 4, specifically the four plug contacts 21 and the four plug contacts 22 for the power supply. Two of the plug contacts 22 for the power supply in this case form the conductor for the GROUND potential, while the two further plug contacts 22 form the voltage line with the voltage potential of preferably 12 volts. A fixed predetermined position of the individual plug contacts, for example by arranging one of the GROUND plug contacts 22 in the centre, makes it possible to ensure that a connection of a plug to a plug connection 11 can only ever be made in the same manner and with predetermined contact being made, without errors being able to occur as a result of incorrect plug connections. The geometry of the distribution of the plug contacts 21, 22 on the plug connection 11 also ensures that a cable such as a transmission cable with its eight-pole cable plug can be connected to the plug connection 11 in only one specific position.

The configuration of the intrinsically safe controllers 50 for use in the network 100 will now first of all be explained briefly with reference to FIG. 1. Both of the intrinsically safe appliances 50 illustrated in FIG. 1 have a plug connection 51 on the input side, whose configuration is identical to the plug connection 11 on the connection unit 10, as a result of which reference is made to the description there. The plug connection 51 also has eight plug contacts 61, 62 with contact wiring as explained for the plug connection 11 with reference to FIG. 4. The plug contacts 62 for the voltage supply are on the one hand connected to electronics 58, which are arranged in the housing 54 of the intrinsically safe controllers 50, and on the other hand are connected directly to a secondary plug connection 71, which is once again configured in the same way as the plug connections 11 and 51. Because of the configuration, the secondary plug connection 71 could also form the input side of the controller 50. The sketch in FIG. 1 shows well that the two plug contacts 62 on the plug connection 51 for the power supply for the controller 50 are connected via the two wiring lines 63 to the plug contacts 82 on the secondary plug connection 71. Once again, a network interface 65 is arranged on the plug connection 51 behind the plug contact 61 for signal transmission, and is configured in the same way as the network interface 15 in the connection unit 10. There are also plug contacts 81 for data communication on the secondary plug connection 71, once again with a network interface 65 being connected upstream of these plug contacts 81 within the housing 54. All of the network interfaces 65 of the intrinsically safe controller 50 are controlled via the electronics 58.

All of the network interfaces 15, 15A, 15B, 15C in the connection unit 10 or 65 in the intrinsically safe controller 50 are configured identically to one another, and each have a decoupling circuit with a transmission element 30 for both transmission directions, and the configuration of the decoupling circuit will now be explained first of all with additional reference to FIG. 3.

FIG. 3 illustrates only the circuit arrangement for one signal direction of a network interface 15 or 65, with the circuit part which is illustrated in the left-hand half and has the Tx-PHY semiconductor component forming the transmitter part, and the right-hand circuit part with the Rx-PHY semiconductor component forming the receiver part of the network interface. A transmission element 30 is in each case located between the PHY semiconductor modules and the plug connections 11 and 51, which are only partially indicated, which transmission element 30 may consist, in a manner known per se, of a core with windings arranged on it, as is familiar to a person skilled in the art for the configuration of corresponding network interfaces, in particular interfaces for the Ethernet protocol. According to the refinement of the network interface 15, 65 according to the invention for use in explosion-risk areas, a circuit stage 31 on the electronics side is in each case provided between the transmission element and each PHY which is arranged on the associated electronics (18, 58, FIG. 1). Furthermore, a circuit stage 32 on the plug connection side is arranged between the transmission element 30 and the plug connection 11 or 51. Each of the circuit stages 31 on the electronics side has, as illustrated, a resistance network, which is annotated with the reference symbol 35 overall, while the circuit stage 32 on the plug connection side has a capacitor network 36, in this case consisting of the two capacitors C1, C2 in the transmitter part and the two capacitors C3, C4 in the receiver part. Although the figures in each case illustrate only one capacitor C1, C2, C3, C4 in each signal path in the capacitor network 36, the capacitors are, however, preferably duplicated for redundancy reasons and each consist of two series-connected capacitances in order that power decoupling can still be ensured in the event of a fault, if one capacitor C1, C2, C3, C4 is shorted, despite the second, series-connected capacitor. Since one capacitance is arranged in each transmission path or signal path with at least one capacitor C1, C2, C3, C4, this ensures that no DC power can be transmitted. The capacitances should be chosen to be as small as possible, in order to minimize the physical size as well, in which case, however, the RF signal to be transmitted should be subject to as little interference as possible in order to allow a 100 Mbit/s signal to be transmitted and received without interference. For this purpose, by way of example, the capacitors in each transmission path may together have a capacitance of about 16 nF, although larger capacitances may also be used.

A 100 Mbit/s transmission rate is standard for an Ethernet interface. Two resistors R5, R6; R7, R8; R9, R10 as well as R11, R12 are arranged as components of the resistance network 35 upstream of each transmission element 30 in each signal path for the transmission path, and limit the power of the radio-frequency signal in order that only desired appliances, and any desired numbers of appliances, with this interface specification (point-to-point link) can be interconnected in intrinsically safe networks. Said resistors R5 to R16 in the resistance network 35 ensure limiting of the power coupling with respect to the RF power (radio-frequency AC voltage power), in particular in conjunction with an intrinsically safe voltage supply for the transmitter semiconductor modules Tx-PHY and the receiver semiconductor modules Rx-PHY. In addition, the resistance network 35 also contains the resistors R1, R2, R3, R4, as is also known for a "traditional" Ethernet network interface. Because of the arrangement of the resistors, each resistance network 35 is in the form of a 2-port network both for the transmitter part with the associated Tx-PHY and for the receiver part with the associated Rx-PHY, with the resistance networks 35 being designed such that a terminating impedance $z_0$ of about 100Ω exists in each case, allowing, RF power limiting at the same time. By way of example, the resistors R5 to R16 may be 3Ω resistors, and the resistors R1 to R4, for example, 47Ω resistors. The resistances of the resistors should be chosen such that, on the one hand, adequate RF power limiting is achieved, while the attenuation losses are not excessive at the same time. For a maximum voltage for the individual PHY semiconductor modules of about 2.7 volts, for example, the total power in the signal paths can thus be kept below an upper limit.

Figure 2:
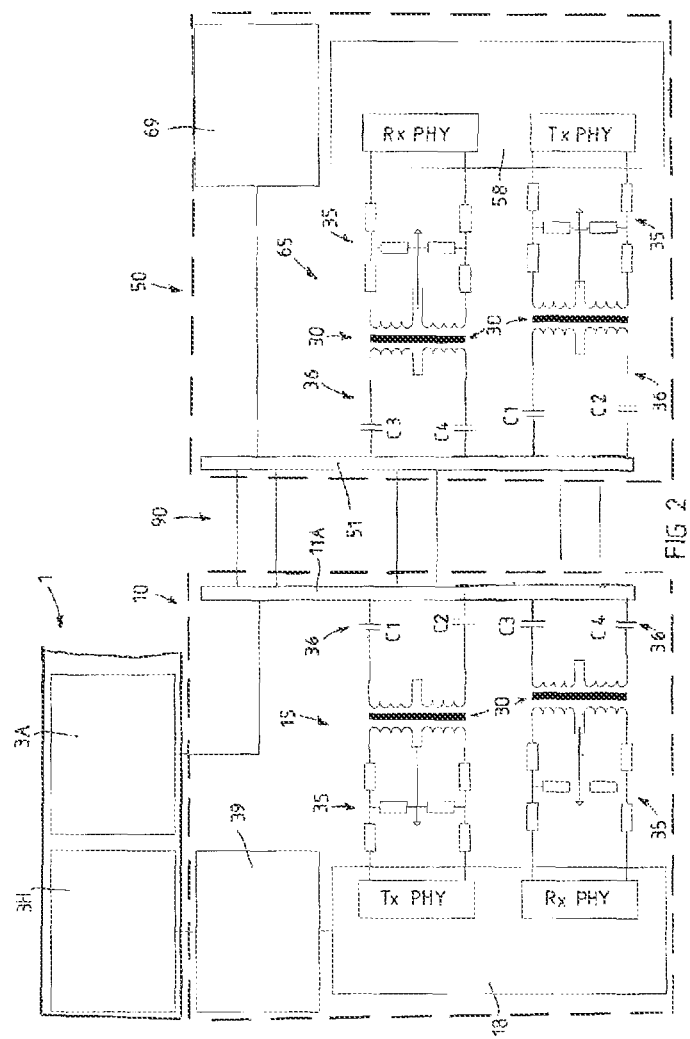
FIG. 2 uses a schematic circuit diagram to illustrate further details of the connection unit shown in FIG. 1, together with the connected controller and the intrinsically safe network interface used in it.

Reference will now be made to FIG. 2, in which some of the components described further above for an intrinsically safe, underground network 100, are illustrated once again in detail and in extracted form. However, FIG. 2 shows only plug connection 11A on the connection unit 10 as well as the plug connection 51 on the controller 50. In addition, only the intrinsically safe power supply 3H for the electronics 18 in the connection unit and the power supply 3A for feeding power at the first plug connection 11A, and therefore the power supply for all of the appliances connected to the plug connection 11A, as well as the electronics 58 in the controller 50, are also illustrated from the power supply unit 1. In order to ensure the power limiting, as described further above, for the electronics 18 in the connection unit 10 and for the electronics 58 in the controller 50, the electronics 18, 58 preferably each have an associated intrinsically safe power limiting circuit 39 in the connection unit 10 and, respectively, power limiting circuit 69 in the controller 50. The power limiting circuit 39 limits the current supplied by the power supply 3H for the electronics 18 in the connection unit 10, and the voltage applied, to a predeterminable input current of, for example, about 1 ampere and approximately 2.7 volts. Correspondingly, the power limiting circuit 69 limits the current supplied by the power supply 3A for the electronics 58 in the controller 50 and the voltage applied to it to a predeterminable input current of, for example, about 1 ampere and to an input voltage of approximately 2.7 volts. The power limiting circuit 39, 69 may also be associated with an input protection circuit with diodes, in which case both the input protection circuit and a current limiting circuit are preferably in each case duplicated in order to ensure the protection function still exists if one of the circuits malfunctions. Each controller 50 should be provided with a corresponding power limiting circuit 69. FIG. 2 indicates particularly clearly that the network interfaces 15 and 65 have the same configuration and each have a transmitter part and a receiver part, configured in the same way as one another, in each case with a capacitor network 36 and a resistance network 35.

All of the transmission between the plug connection 11A on the connection unit 10 and the plug connection 51 on the controller 90 takes place by means of a schematically illustrated transmission cable, which preferably has eight cores, for the reasons mentioned further above. A power cable for connecting the power supplies to the connection unit preferably has 14 cores, in order to allow a power supply unit 1 with seven power supplies 3 to be connected to a connection unit 10 with six current-carrying plug connections 11.

Numerous modifications will be evident to a person skilled in the art from the above description and are intended to be covered within the scope of protection of the dependent claims. The figures illustrate an Ethernet interface as a preferred exemplary embodiment. However, the selected circuit principle can also be applied to similar interfaces, such as an interface based on the RS485 circuit principle. In addition, a greater or lesser number of plug connections could be provided in each connection unit, and each connection unit could also have a plurality of blind plugs or the like, in addition to the optical waveguide connections as optical connections.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An intrinsically safe connection unit with a network interface for intrinsically safe appliances in explosion-risk areas, the connection unit comprising:
   a housing;
   a voltage supply connection on the housing and including a central feed connection;
   at least one plug connection on the housing for connection of a transmission cable for an intrinsically safe appliance to the connection unit; and
   a decoupling circuit connected upstream of each plug connection and arranged in the housing, each decoupling circuit including a resistance network in each signal path of the decoupling circuit for radio-frequency power limiting,
   wherein the central feed connection includes separate supply cores for each plug connection, each plug connection including at least two plug contacts for data communication and at least two plug contacts connected to the associated supply cores for supplying power to each appliance via the transmission cable.

2. The connection unit according to claim 1, wherein a total of X plug connections for combined data and power supply are provided on the housing, and in that the central feed connection has 2*X supply cores and two additional supply cores, wherein the additional supply cores are used for separately supplying power to at least one of the decoupling circuits and electronics which are connected upstream of the decoupling circuits.

3. The connection unit according to claim 2, wherein X=6 plug connections are formed on the housing.

4. The connection unit according to claim 2, wherein the central feed connection is connectable to a power supply unit via a power supply cable having (2*X+2) cores.

5. The connection unit according to claim 4, wherein the power supply cable includes a 14-core power supply cable, which power supply unit has X+1 separate power supply in a preferably pressure-resistant housing, with the output side of each power supply being connected to a preferably central feed connection of the power supply cable.

6. The connection unit according to 2, wherein the electronics which are connected upstream of the decoupling circuits are associated on the input side with a power limiting circuit, by way of which the current supplied with the power supply and the applied voltage are limited to a predeterminable input current and a predeterminable input voltage for the electronics.

7. The connection unit according to claim 6, wherein the decoupling circuit has a circuit stage on a plug connection side and a circuit stage on an electronics side, providing DC voltage decoupling for the circuit stage on the plug connection side, wherein the circuit stage on the plug side has a capacitor network for direct-current power decoupling from other plug connections of the same type.

8. The connection unit according to claim 7, wherein each circuit stage on the electronics side has a transmitter (Tx-PHY) and a receiver (Rx-PHY) for bidirectional data communication, wherein a transmission element of the decoupling circuit is connected downstream from a two-pole transmitter output, and a separate transmission element of the decoupling circuit is connected upstream of the two-pole receiver output and decouples the circuit stage on the plug side from the circuit stage on the electronics side, wherein a capacitor is connected between the transmission element and the plug contact for data communication on the plug connection, for each contact pole of a transmitter output or receiver input, for DC voltage decoupling in the circuit stage on the plug side, wherein the resistance network includes resistors connected as port elements with a 2-port-characteristic between each contact pole and the associated transmission element, for radio-frequency power limiting.

9. The connection unit according to claim 8, wherein the resistance network includes two resistors connected in series between the PHY and the transmission element in each signal path of the resistance network.

10. The connection unit according to claim 7, wherein the capacitors in the capacitor network each have two series-connected capacitor elements.

11. The connection unit according to claim 1, wherein at least one optical connection for optical data communication, is provided in addition to the plug connections on the housing.

12. The connection unit according to claim 1, wherein additional plug connections are provided on the housing, the additional plug connections included at least one of plug connections without plug contacts for power supply and plug connections with blind contacts, which are not connected to supply cores.

13. The connection unit according to claim 1, wherein each plug connection is provided with in each case two plug contacts for each power potential and with four plug contacts for data communication.

14. The connection unit according to claim 1, wherein each plug connection is provided with eight plug contacts, of which two plug contacts are in each case provided for each power potential, and four plug contacts are provided for data communication.

15. An intrinsically safe controller for connection to a connection unit with a network interface, the controller comprising:
an appliance housing;
a plug connection arranged on the appliance housing and connectable to a transmission cable, the plug connection having at least two plug contacts for data communication and at least two plug contacts for a power supply via the transmission cable; and
a decoupling circuit arranged in the appliance housing and connected downstream from the plug connection, the decoupling circuit including a resistance network in each signal path of the decoupling circuit for radio-frequency power limiting and connected to electronics to decouple direct current power.

16. The controller according to claim 15, wherein each appliance housing is provided with a secondary plug connection, which is designed to be identical to the plug connection and is connected to the electronics in the controller, wherein the plug contacts for the power supply on the secondary plug connection are electrically connected to the plug contacts on the plug connection.

17. The controller according to claim 15, wherein the electronics which are connected upstream of the decoupling circuits are associated on the input side with a power limiting circuit, by way of which the current supplied with the power supply and the applied voltage are limited to a predeterminable input current and a predeterminable input voltage for the electronics.

18. The controller according to claim 17, wherein the decoupling circuit has a circuit stage on the plug connection side and a circuit stage on the electronics side, providing DC voltage decoupling for the circuit stage on the plug connection side, wherein the circuit stage on the plug side has a capacitor network for direct-current power decoupling from other plug connections of the same type.

19. The controller according to claim 18, wherein each circuit stage on the electronics side has a transmitter (Tx-PHY) and a receiver (Rx-PHY) for bidirectional data communication, wherein a transmission element of the decoupling circuit is connected downstream from a two-pole transmitter output, and a separate transmission element of the decoupling circuit is connected upstream of the two-pole receiver output and decouples the circuit stage on the plug side from the circuit stage on the electronics side, wherein a capacitor is connected between the transmission element and the plug contact for data communication on the plug connection, for each contact pole of a transmitter output or receiver input, for DC voltage decoupling in the circuit stage on the plug side, wherein the resistors are connected as port elements with a 2-port-characteristic between each contact pole and the associated transmission element, for radio-frequency power limiting.

20. The controller according to claim 19, wherein the resistance network includes two resistors connected in series between the PHY and the transmission element in each signal path of the resistance network.

21. The controller according to claim 18, wherein the capacitors in the capacitor network each have two series-connected capacitor elements.

22. The controller according to claim 15, wherein each plug connection is provided with eight plug contacts, of which two plug contacts are in each case provided for each power potential, and four plug contacts are provided for data communication.

23. A network interface for explosion-risk areas comprising:
an electronics component;
a plug connection;
at least one transmission element;
a first circuit stage connected between each transmission element and the electronics component and including a resistance network in each signal path of the first circuit stage for radio-frequency power limiting; and
a second circuit stage connected between each transmission element and the plug connection and including a capacitor network for direct current power decoupling.

24. The network interface according to claim 23, wherein the electronics component includes a transmitter (Tx-PHY) and a receiver (Rx-PHY) for bidirectional data communication, wherein a first transmission element of the at least one transmission element is connected downstream from a two-pole transmitter output, and a second transmission element of the at least one transmission element is connected upstream of the two-pole receiver output wherein the resistance network is connected as port elements with a 2-port-characteristic between each contact pole and the associated transmission element.

25. The network interface according to claim 24, wherein the resistance network includes two resistors connected in series between the PHY and the transmission element in each signal path of the resistance network.

26. The network interface according to claim 23, wherein the capacitor network includes capacitors, each having two series-connected capacitor elements.

27. The network interface according to claim 23, wherein the plug connection is provided with eight plug contacts, of which two plug contacts are in each case provided for each power potential, and four plug contacts are provided for data communication.

* * * * *